United States Patent Office 3,212,984
Patented Oct. 19, 1965

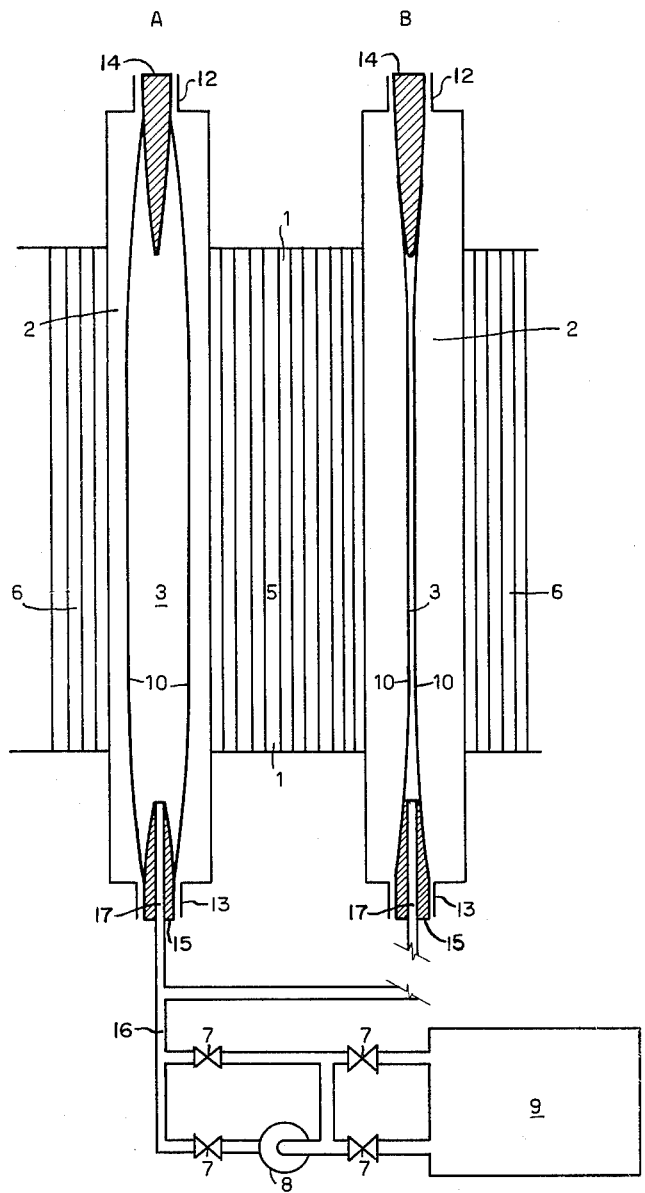

3,212,984
METHOD OF VARYING THE MODERATION
IN A NUCLEAR REACTOR
Louis Henri Joseph Tollet and Pierre Edmond Jules Marie Maldague, Brussels, Belgium, assignors, by mesne assignments, to Société anglo-belge Vulcain, Société anonyme, Brussels, Belgium
Filed May 21, 1962, Ser. No. 196,090
Claims priority, application Belgium, May 24, 1961, 481,081
4 Claims. (Cl. 176—42)

This invention relates to nuclear reactors.

Nuclear reactors in which the coolant and the moderating fluid are held separate (for the control of the reactivity), may be regulated wholly or in part by modifying the composition of the moderator. In order to increase or diminish the reactivity, the moderating properties of the moderator may be improved or diminished by modifying the said composition.

According to the present invention, the moderating properties of the moderator are modified by subdividing the enclosure or enclosures containing the moderator (which enclosures are provided in the core of the reactor) into two or several sub-chambers filled with different moderating fluid. By modifying the volume of one or several of the sub-chambers, the quantities of each of the fluids vary and the resulting moderator has different moderating characteristics.

The accompanying drawing is a schematic sectional representation of a reactor in which the method of the invention may be practiced. The reactor is a fluid-moderated reactor in which the moderation can be varied by changing the respective volumes of different moderating fluids which, considered collectively, constitute the moderator for this particular reactor. Within the reactor core 1 are fuel elements 6 arranged about moderator spaces defining moderator chambers 2, which are open at their upper and lower ends 12 and 13. Within the chambers 2 are expansible-contractible chambers 3 defined by flexible walls 10 and end members 14 and 15. A first moderating fluid, which may be the same as the cooling fluid which sweeps the fuel elements 6, is present in the chambers 2. A second moderating fluid of different moderating characteristics than the first, is present in the chambers 3.

Through a conduit system 16 and a channel 17 through its own lower end 15, each chamber 3 communicates with a reservoir 9 for the second moderating fluid. By means of valves 7 and pump 8 in the conduit system, the pressure of the second moderator fluid in the chambers 3 can be varied. Flexible walls 10 of the chambers 3 are adapted to expand and contract in response to such pressure variation.

At A in the drawing, a chamber 3 has been illustrated as it would appear when there is in that chamber a pressure higher than that at 2. The volume of the component filling the chamber 3 is at a maximum, that of the component inside the chamber 2 is minimum. The result is that the respective volumes of the two moderating fluids are such as to provide collective moderating characteristics approaching those of the component in chamber 3. For a different position of the valves 7, the pressure prevailing at 3 is brought below that prevailing in chamber 2. The volume of the chamber 3 is thereby reduced to a minimum, as illustrated in the drawing at B; the result is that the respective volumes of the two moderating fluids are such as to provide collective moderating characteristics approaching those of the component contained in chamber 2. Obviously it is possible to provide all intermediary pressures in the chamber 3 and thereby vary the volume of chamber 3, the respective volumes of both of the moderating fluids and their collective moderating characteristics, thus facilitating operation of the reactor.

By way of example, the coolant for the core of the depicted reactor may be heavy water or a mixture rich in heavy water, which coolant flows through the portions of the reactor indicated by reference numeral 5 and through chamber 2. The chambers 3 and reservoir 9 may contain light water or a mixture rich in light water. When the volume of the chamber 3 is varied, as previously explained, the respective volumes of heavy and light water in the chambers 2 and 3 are thus modified, with a corresponding effect on moderation.

The reactor may be stopped by injecting poison into the chambers 3. The reactor may be brought back up to power by rinsing and replacing the poisoned second moderator fluid in the chambers 3 with fresh moderator fluid. The injection of poisons, soluble or insoluble, may even ensure the control of the reactor.

The volume of the chambers or receptacles 3 being small, the amount of poisoned moderating fluid to be stored, is also small. The chambers or enclosures 3 have inner shapes which are simple and without recesses, the rinsing is easy and requires a small amount of rinsing fluid only. It is also possible to fill the chambers or enclosures 3 with an inexpensive moderating fluid, and the fluid after poisoning may be removed without attempting to recover the rinsing fluid.

What we claim is:

1. A method of operating a nuclear reactor having a core and a moderator space in said core defining a moderator chamber, a first moderator fluid in said chamber, an expansible-contractible member in said chamber filled with a second fluid under pressure and of different moderating characteristics than said first moderator fluid, said method comprising varying the respective volumes of both said moderator fluids by changing the pressure of the second fluid to expand and contract said expansible-contractible member.

2. A method in accordance with claim 1 wherein said first moderator fluid includes heavy water.

3. A method in accordance with claim 1 wherein said second moderator fluid includes light water.

4. A method in accordance with claim 1 wherein said second moderator fluid contains poison.

References Cited by the Examiner

UNITED STATES PATENTS

| 2,982,712 | 5/61 | Heckman | 176—20 |
| 2,999,059 | 9/61 | Treshow | 176—42 |

FOREIGN PATENTS

| 222,673 | 1/58 | Australia | 176—86 |
| 799,001 | 7/58 | Great Britain. | |

OTHER REFERENCES

Schultz: "Control of Nuclear Reactors and Power Plants," (McGraw-Hill, New York, 1961) (page 215 relied on).

CARL D. QUARFORTH, Primary Examiner.

REUBEN EPSTEIN, L. DEWAYNE RUTLEDGE,
Examiners.